(12) United States Patent  (10) Patent No.: US 9,104,774 B2
Falkenberg et al.  (45) Date of Patent: Aug. 11, 2015

(54) CONSISTENT WEB APPLICATION PRESENTATION

(75) Inventors: Matthias Falkenberg, Boeblingen (DE); Richard Jacob, Boeblingen (DE); Stephan Laertz, Boeblingen (DE); Carsten Leue, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 244 days.

(21) Appl. No.: 13/299,190

(22) Filed: Nov. 17, 2011

(65) Prior Publication Data

US 2012/0136922 A1    May 31, 2012

(30) Foreign Application Priority Data

Nov. 29, 2010 (EP) ..................................... 10192939

(51) Int. Cl.
*G06F 15/16* (2006.01)
*G06F 17/30* (2006.01)

(52) U.S. Cl.
CPC .................................. *G06F 17/3089* (2013.01)

(58) Field of Classification Search
CPC ................................................ G06F 17/30899
USPC ........... 715/234–238, 742–746; 709/201–203
See application file for complete search history.

(56) References Cited

U.S. PATENT DOCUMENTS

| 8,234,348 | B1 | 7/2012 | Tulchinsky et al. |
| 2004/0088653 | A1 | 5/2004 | Bell et al. |
| 2005/0256940 | A1 | 11/2005 | Henderson et al. |
| 2006/0047777 | A1* | 3/2006 | Harris et al. ................... 709/217 |
| 2006/0212806 | A1 | 9/2006 | Griffin et al. |
| 2007/0016857 | A1 | 1/2007 | Polleck et al. |
| 2007/0240041 | A1* | 10/2007 | Pearson ........................ 715/522 |
| 2008/0082955 | A1 | 4/2008 | Andreessen et al. |
| 2008/0263090 | A1* | 10/2008 | Roy-Chowdhury et al. .......................... 707/103 X |
| 2009/0013267 | A1 | 1/2009 | Cudich et al. |
| 2009/0031211 | A1 | 1/2009 | Yao et al. |
| 2009/0044152 | A1 | 2/2009 | Bohn et al. |
| 2009/0150766 | A1 | 6/2009 | Fukuda et al. |
| 2010/0180194 | A1 | 7/2010 | Ji et al. |
| 2011/0161803 | A1* | 6/2011 | Yao et al. ...................... 715/235 |

FOREIGN PATENT DOCUMENTS

CN      101512483 A      8/2009

OTHER PUBLICATIONS

David Berry, Using Cascading Style Sheets on Your Web Site, Webpage, Jan. 2003, pp. 1-11, Microsoft, Published on the World Wide Web at: http://msdn.microsoft.com/en-us/library/aa140116(d=printer,v=office.10).aspx.

(Continued)

*Primary Examiner* — Chirag R Patel
(74) *Attorney, Agent, or Firm* — Lee Law, PLLC; Christopher B. Lee

(57) ABSTRACT

A request for a web page is received from a client device at a web server. At least a source web application and a target web application relating to the requested web page is identified. An output from the source web application and an output from the target web application are requested. A source style of the source web application is requested. The source style is combined with the output of the source web application and the output of the target web application into the requested web page. The requested web page is sent to the client device.

19 Claims, 7 Drawing Sheets

(56) References Cited

OTHER PUBLICATIONS

Steve Joubert, Beginning ASP.NET 2.0: Getting Started with Master Pages and Themes, Webpage, Mar. 27, 2006, pp. 1-8, Red Gate Software, Published on the World Wide Web at: http://www.simple-talk.com/dotnet/asp.net/beginning-asp.net-2.0/.

Jon Michael Verese, Understanding cascading style sheets, Webpage, May 17, 2010, pp. 1-4 (plus 1 citation page added), Adobe Systems Incorporated, Published on the World Wide Web at: http://www.addlifetotheweb.com/ devnet/dreamweaver/articles/understanding_css.html.

Chirag R. Patel, Examiner, United States Patent and Trademark Office, Office Action for U.S. Appl. No. 13/434,460, Jul. 17, 2013, pp. 1-16, Alexandria, VA, USA.

Chirag R. Patel, Examiner, United States Patent and Trademark Office, Office Action for U.S. Appl. No. 13/434,460, Nov. 29, 2013, pp. 1-17, Alexandria, VA, USA.

Chirag R. Patel, Examiner, United States Patent and Trademark Office, Office Action for U.S. Appl. No. 13/434,460, Aug. 28, 2014, pp. 1-15, Alexandria, VA, USA.

Chirag R. Patel, Examiner, United States Patent and Trademark Office, Office Action for U.S. Appl. No. 13/434,460, Dec. 16, 2014, pp. 1-16, Alexandria, VA, USA.

\* cited by examiner

CONSISTENT WEB APPLICATION PRESENTATION

RELATED APPLICATIONS

This application claims priority to and claims the benefit of European Patent Application Serial No. EP10192939.6 titled "METHOD AND SYSTEM FOR CONSISTENT WEB APPLICATION PRESENTATION," which was filed in the European Patent Office on Nov. 29, 2010, and which is incorporated herein by reference in its entirety.

BACKGROUND

The present subject matter relates generally to consistent web application presentation, in particular in web application aggregation systems. The present subject matter relates further to a style masking engine for a portal, a computer system, a data processing program, and a computer program product.

In consumer applications as well as in enterprise applications, portals are a tool used to aggregate outputs of different information sources and numerous web applications. Users may be responsible for the organizing of sub-windows of a portal window of a computer display. This has become a convenient way of organizing information and applications within one screen layout. Web applications may have numerous types (e.g., iWidgets, portlets, web portal artifacts like portlet skins, etc.).

While programming languages and models may differ, output-related applications may produce and adhere to certain standards that are "understood" by a wide range of client software (e.g., a web browser). Output of web applications may encompass markup, style definitions, scripts, and other forms of output. Web application developers may determine the style of outputs produced by web applications resulting in diverse styles and layouts using different color schemes, different fonts, or different font sizes.

BRIEF SUMMARY

A method for masking a style of a web application as well as to a style masking engine may be implemented according to the independent claims.

A method for masking a style of a web application by a web server includes receiving a request for a web page from a client device at the web server; identifying at least a source web application and a target web application relating to the requested web page; requesting an output from the source web application and an output from the target web application; requesting a source style of the source web application; combining the source style with the output of the source web application and the output of the target web application into the requested web page; and sending the requested web page to the client device.

A style masking engine includes a receiving unit configured to receive a request for a web page from a client device at the web server; a web application aggregator configured to identify at least a source web application and a target web application relating to the requested web page; a web application renderer configured to request an output from the source web application and an output from the target web application; a web application style mapper configured to request a source style of the source web application and configured to combine the source style with the output of the source web application and the output of the target web application into the requested web page; and a sending unit configured to send the requested web page to the client device.

A computer system includes a communication interface and one or more processors programmed to receive a request for a web page from a client device at a web server via the communication interface; identify at least a source web application and a target web application relating to the requested web page; request an output from the source web application and an output from the target web application; request a source style of the source web application; combine the source style with the output of the source web application and the output of the target web application into the requested web page; and send the requested web page to the client device via the communication interface.

A computer program product includes a computer readable storage medium including computer readable program code, where the computer readable program code when executed on a computer causes the computer to receive a request for a web page from a client device at a web server; identify at least a source web application and a target web application relating to the requested web page; request an output from the source web application and an output from the target web application; request a source style of the source web application; combine the source style with the output of the source web application and the output of the target web application into the requested web page; and send the requested web page to the client device It should also be noted that embodiments of the subject matter have been described with reference to different subject-matters. In particular, some embodiments have been described with reference to method type claims, whereas other embodiments have been described with reference to apparatus type claims. However, a person skilled in the art will gather from the teachings within the following description that, unless otherwise notified, in addition to any combination of features belonging to one type of subject matter, also any combination between features relating to different subject matters, in particular between features of the method type claims, and features of the apparatus type claims, is considered as to be disclosed within this document.

The aspects defined above and further aspects of the present subject matter are apparent from the examples of embodiments to be described hereinafter and are explained with reference to the examples of embodiments, but to which the invention is not limited.

BRIEF DESCRIPTION OF THE SEVERAL VIEWS OF THE DRAWINGS

Preferred embodiments of the present subject matter will now be described, by way of example only, and with reference to the following drawings.

DETAILED DESCRIPTION

Figure 1:
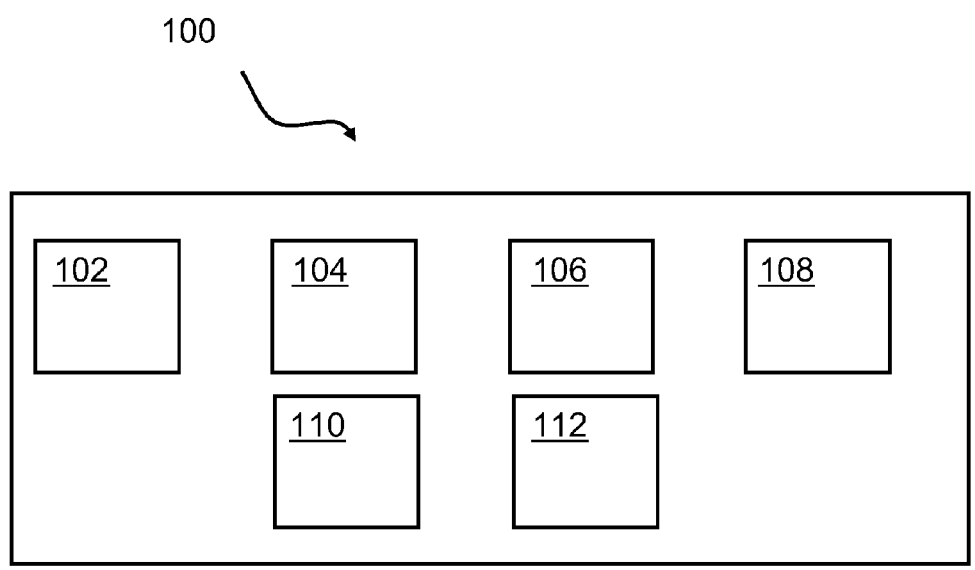
FIG. 1 is a block diagram of an example of an implementation of a process/method for masking a style of a web application by a web server, in particular a web portal server.

In the following, a detailed description of the drawings will be given. All illustrations in the drawings may be considered schematic. First, a block diagram of the method for a consistent web application presentation will be described. Afterwards, several system components and related elements will be described. Finally, flow charts of how to define a source and a target application are illustrated and described.

It should be noted that conception of the present subject matter resulted from recognition of certain limitations associated with web application presentation. For example, it was recognized that client software generally serves as an interpreter (e.g., a browser) of the output received from server software hosting the web applications, but that the options to adapt layouts and styles on the client side may be limited or non-existent. It was recognized that these limitations are because server software handles the communication between client software and web applications of servers. The client software may only generate a view on the web application for users and may hide the complexity of the underlying programming. Multiple web applications may share the space available on a single web page by means of aggregation (i.e., typically a web portal). The aggregation of the output of several web applications into a single web page may be performed by the server software (e.g., web portal) or by the client software (e.g. a web browser). Usually, different types of web applications may contribute to a single web page resulting in a heterogeneous aggregation and a heterogeneous appearance. The server or client software may enrich the web page with additional artifacts that may represent web applications themselves (e.g., to add or remove web applications to or from a web page, respectively) or allow users to access otherwise hidden options of a particular web application, or facilitate navigation between web pages.

It was further recognized that advances in web technology may be utilized to empower users in terms of interacting with and personalizing web pages. However, it was also recognized that, typically, users are not entitled to modify the style of the web applications but may compose web pages with web applications from different sources. It was additionally recognized that while users may pay considerable attention to the design of web pages, limited functionality has been available.

Conception of the present subject matter also resulted from recognition that, given that the style of a web application is part of the web application programming, web application developers, rather than users, determine the looks. While users may choose to consume web applications, they are not entitled to modify the style, which is programmed into the output of web applications. It was additionally recognized that because web application developers do not necessarily know how a web application is used once made available to users, web pages may lose their consistent style if users are granted the permission to add web applications from different sources to the web page in order to create a personalized view or dashboard.

The present subject matter improves application output processing by providing a more flexible style layout in portals and for web applications for an easier, more convenient and more adaptable layout of web applications for consumer usage of web applications, as well as in commercial and industrial environments. By use of the present subject matter, more influence of a web page layout may be delegated to end-users instead of web site administrators, editors, or developers.

FIG. 1 is a block diagram of an example of an implementation of a process/method 100 for masking a style of a web application by a web server, in particular a web portal server. The method 100 includes receiving, at block 102, a request for a requested web page from a client device at the web server, in particular at the web portal server. Additionally, the method 100 includes identifying, at block 104, at least a source web application and a target web application relating to the web page. Particularly, this may be performed by a web application aggregator. The method 100 also includes requesting, at block 106, an output from the source web application and an output from the target web application. Particularly, this may be performed by a web application renderer. Furthermore, the method 100 includes requesting, at block 108, a source style of the source web application. In particular, an execution of this step may be performed by a web application style mapper.

Furthermore, the method 100 includes, at block 110, combining the source style with the output from the source web application and with the output of the target web application into the requested web page. The may include combining the source style with a second target application on a second requested web page, and may include analysis of a semantic of elements and data of the target web application. In particular, a web application style mapper may perform such a step. Finally, the method 100 includes sending, at block 112, the requested web page to the client. The requested and now resulting web page, portal page or portal window, may be displayed on a screen attached to a client system. The client system may execute browser software.

It should be noted that the method 100, as just described may not be bound to a server system. A process, such as the method 100, may be implemented to be executed on a client system. In that case, the source and web application may be executed on a server system or on different server systems.

Figure 2:
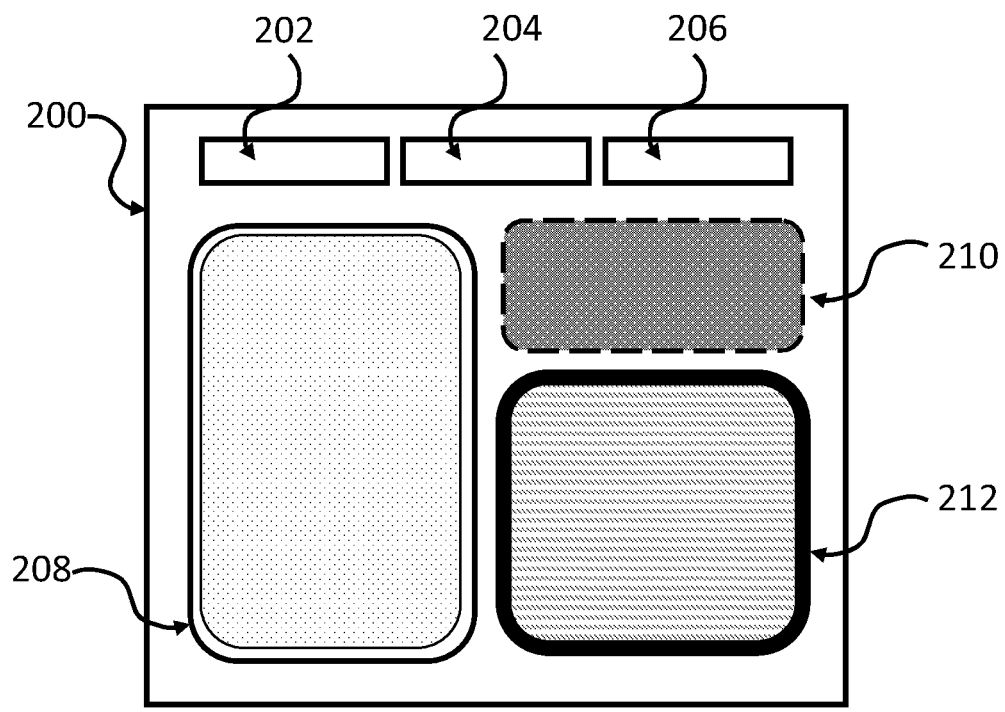
FIG. 2 is a schematic diagram of an example of an implementation of outputs of web applications with different layouts in a portal window.

FIG. 2 is a schematic diagram of an example of an implementation of outputs of web applications with different layouts in a portal window 200. As an example, a series of clickable selection buttons 202, 204, 206 are provided. Additionally, three windows 208, 210, and 212, in particular subwindows of the portal window 200 are illustrated. The three windows 208, 210, 212 may be output windows of web applications. As shown, the windows 208, 210, and 212 have different appearances. The window 208 of a first output of a first web application is shown with a double line frame and a lightly dotted background. The window 210 of a second output of a second web application is shown with a dashed line for a frame and a heavy dotted background. Finally, the window 212 of a third output of a third web application is shown with a strong line frame and a lined background. Of course, any other appearance may be possible, and the layout of the portal window 200 is just one example. A user may arrange or rearrange windows in a browser or a portal as he/she may want. But typically, styles or appearances may not be rearranged.

Figure 3A:
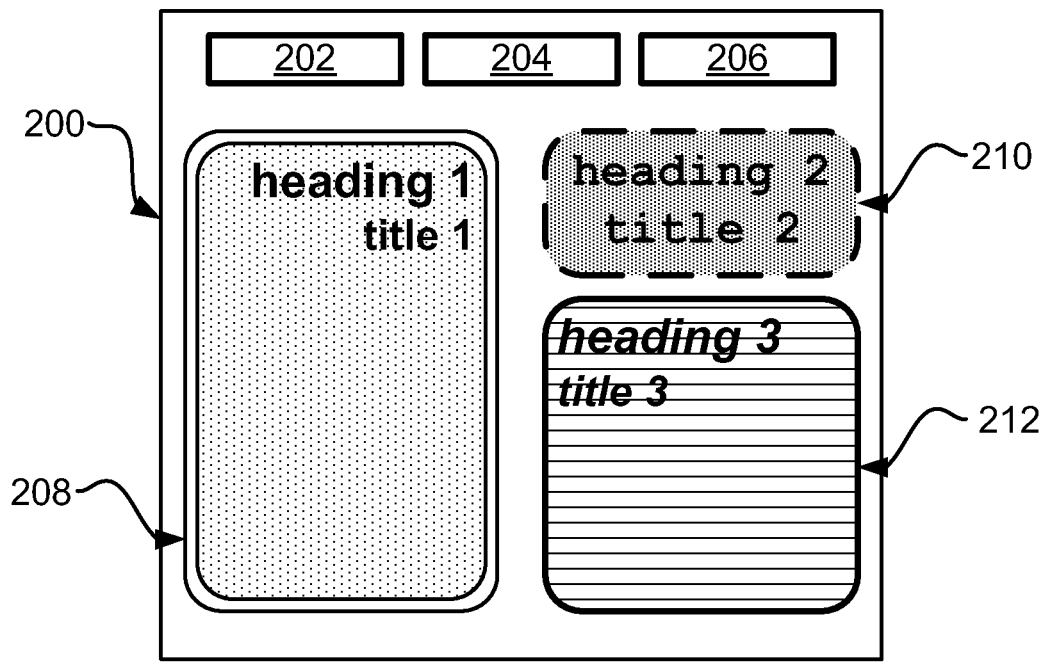
FIG. 3a is a schematic diagram of an example of an implementation of outputs of the web applications similar to those of FIG. 2 with additional details.

FIG. 3a is a schematic diagram of an example of an implementation of outputs of the web applications with additional details. The outputs shown may be similar to those of FIG. 2. However, in FIG. 3a, additional text is shown in the output windows 208, 210, 212 (e.g., "heading 1, title 1," "heading 2, title 2," and "heading 3, title 3"). As may be seen from FIG. 3a, the positioning of the different text fragments as well as a font of the text may be different for each of the output windows 208, 210, 212 (i.e., all three outputs may have a different style).

The user may want to see all three outputs in all three of the output windows 208, 210 and 212 in the same form, font, and general appearance. A user may select, for example, the output window 212 of the third output of a third web application as his favorite. He may define, using a specific user interface, the output window 212 of the third web application as a source web application. A style of this output may be used as a basis for one or more output windows of other web applications within a portal window.

Figure 3B:
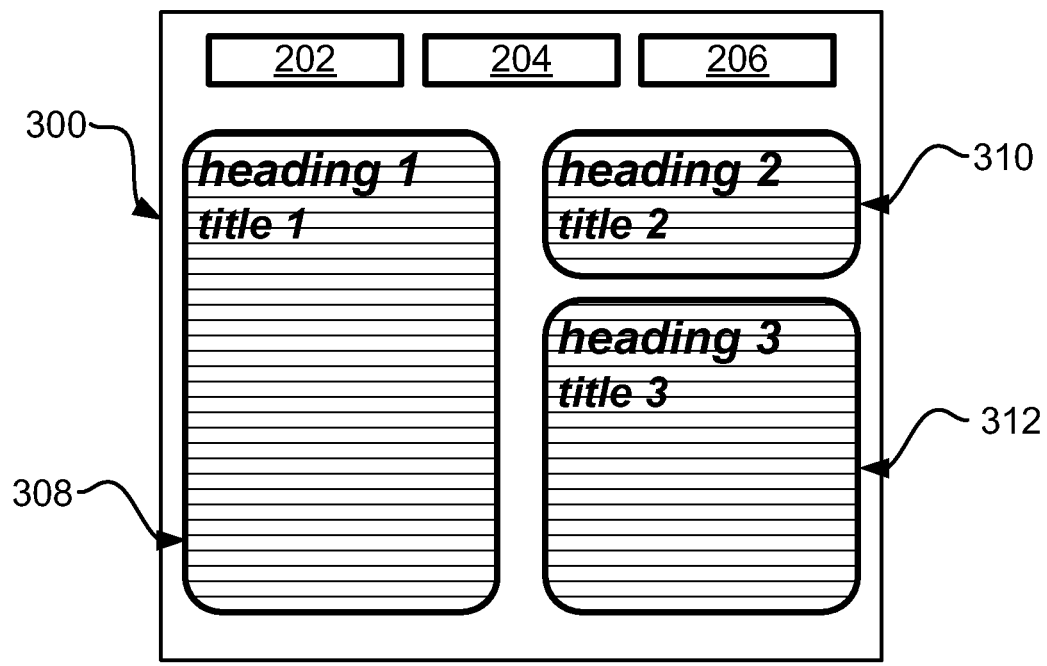
FIG. 3b is a schematic diagram of an example of an implementation of a portal window with outputs of web applications formatted based upon a selected output of a source web application.

FIG. 3b is a schematic diagram of an example of an implementation of a portal window 300 with outputs of web applications formatted based upon a selected output of a source web application. Within FIG. 3b, all three output windows 308, 310, 312 have the same output appearance in the portal window 300. All output windows 308, 310, and 312 now have the strong line frame and a lined background as shown in FIG. 2 and FIG. 3a by reference numeral 212. As a result, a masking of an appearance of an original style of output of web applications within the original windows 208 and 210, and an appearance of outputs of web applications may be much more aligned to requirements of users.

In addition to masking the style of outputs of target web applications, also styles of other portal page elements may be masked. Thus, also the clickable selection buttons 202, 204, and 206 may be adapted such that they appear in the same style as the output of the third web application.

Figure 3C:
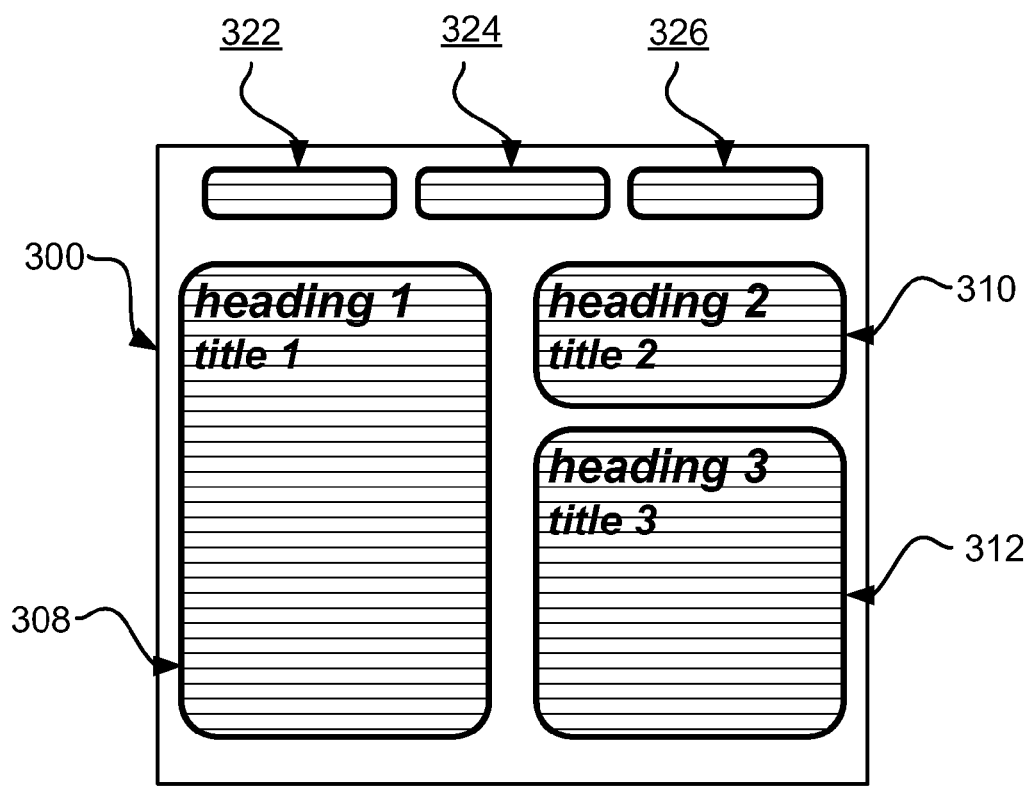
FIG. 3c is a schematic diagram of an implementation of the portal window of FIG. 3b with the clickable selection buttons of FIG. 2 through FIG. 3b modified to match the output style of the third web application.

FIG. 3c is a schematic diagram of an example of an implementation of the portal window 300 of FIG. 3b with the clickable selection buttons 202, 204, and 206 of FIG. 2 through FIG. 3b modified to match the output style of the third web application. In FIG. 3c, the clickable selection buttons 322, 324, 326 are shown in the same style as the output of the third web application 312. It should be noted that no web site administrator was involved in this change of styles, and the changes of styles may be completely user driven.

Figure 4:
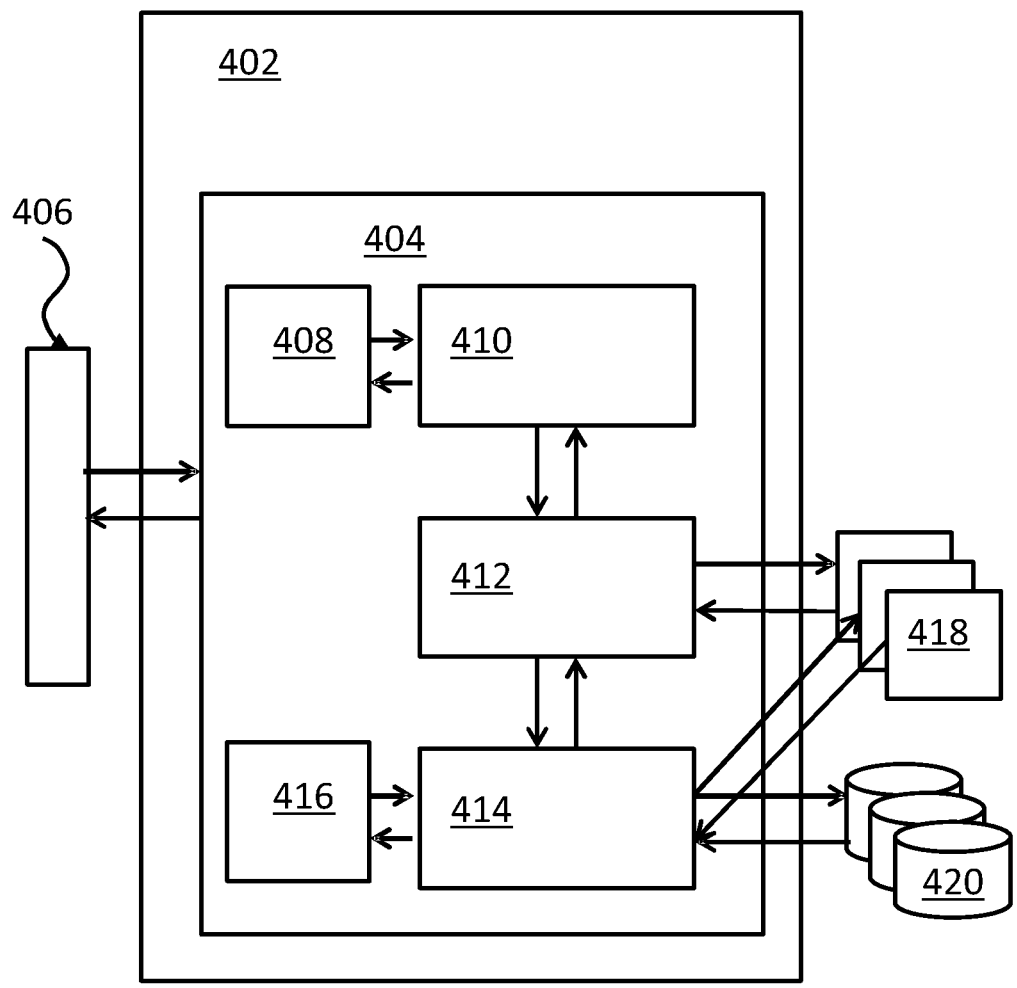
FIG. 4 is a block diagram of an example of an implementation of a style masking engine for a portal.

FIG. 4 is a block diagram of an example of an implementation of a style masking engine 402 for a portal. The style masking engine 402 includes a rendering engine 404 and may be part of a web portal server. The style masking engine 402 includes a receiving unit 408 that may receive a request for a requested web page from a client 406 at the web portal server. A web application aggregator 410 may identify at least a source web application and a target web application out of the web applications 418 relating to the requested web page. The web applications 418 may be executed locally on a web portal server system or remotely on other computer systems. Once the web applications 418 are identified, a web application renderer 412 may request an output from the source web application and an output from the target web application. Arrows in FIG. 4 indicate data and control flows between the different functional blocks. After the requesting of outputs, a web application style mapper 414 may request a source style of the source web application, where the web application style mapper 414 may also combine the source style with the output from the source web application with the output of the target web application into the requested web page. A sending unit 416 may send the requested web page to the client 406. On the client system, the resulting web or portal page may be displayed as indicated in FIG. 3b and FIG. 3c, namely having the same style, as shown for example within the example for output windows 308, 310 and 312. The styles of the web applications may be stored separately from the web applications 418 themselves (e.g., in a storage device 420).

As described above, the style masking engine 402 may alternatively be executed on a client system, in particular with a local web browser.

Figure 6:
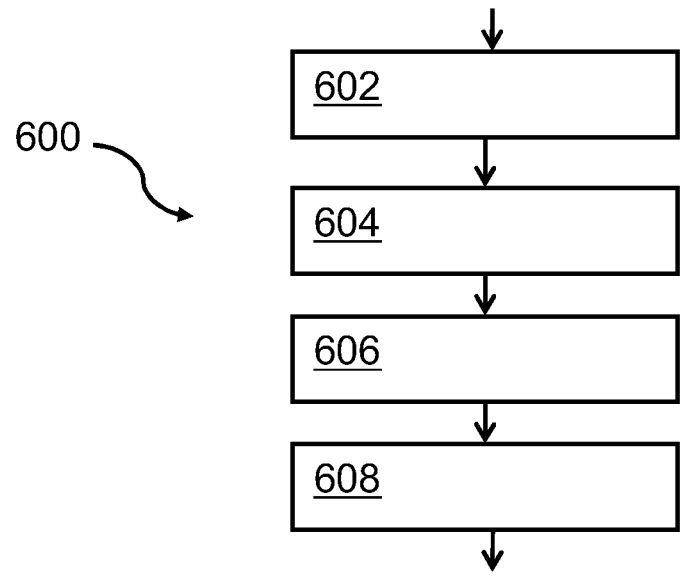
FIG. 6 is a flow chart of an example of a process for selection of a source window.

FIG. 6 is a flow chart of an example of a process 600 for selection of a source window. A user input may be received at block 602. The user input may be, for example, a right click on a frame of a portal window. A pop-up or pull-down menu may be opened in the portal at block 604. The user may select an option, such as "Define this application output window as the source window." A related click may be received at block 606 by the style masking engine 402. The selection may be stored at block 608 as part of a user profile.

Figure 7:
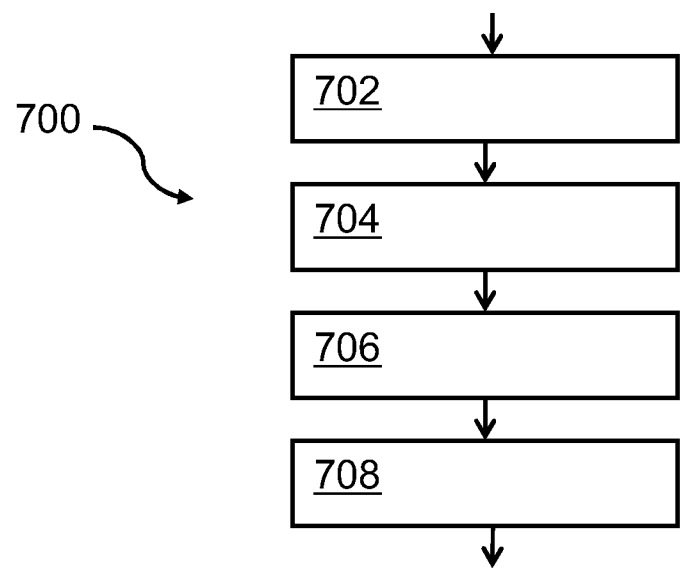
FIG. 7 is a flow chart of a process of such a sequence for selecting a target output window for which output style may be masked.

A similar sequence of steps may be used for selecting a target output window for which output style may be masked. FIG. 7 is a flow chart of a process 700 of such a sequence for selecting a target output window for which output style may be masked. Again, a user input may be received at block 702. For this, a user may right-click in the frame of a window that may be defined as the target window. A pop-up or pull-down window may be opened at block 704 in the portal. The user may select an option, such as "Define this application output window as a target window." A related click may be received at block 706 by the style masking engine 402. The selection may be stored at block 708 as part of a user profile. The style masking engine may then mask the style of the original target window and replace the style with the style of the source window as described above. This process may be repeated for more than just one target window of the portal page or portal window.

In a similar way, styles of other elements of the portal window may be redefined (e.g., masked) using output of a web application as a source window. It should be noted that also other artifacts, fragments, or other elements of a portal page may be used as a source, such that the style of the selected element may be used as source style. For example, a style of portal or portlet skin may be used as the source style.

Figure 5:
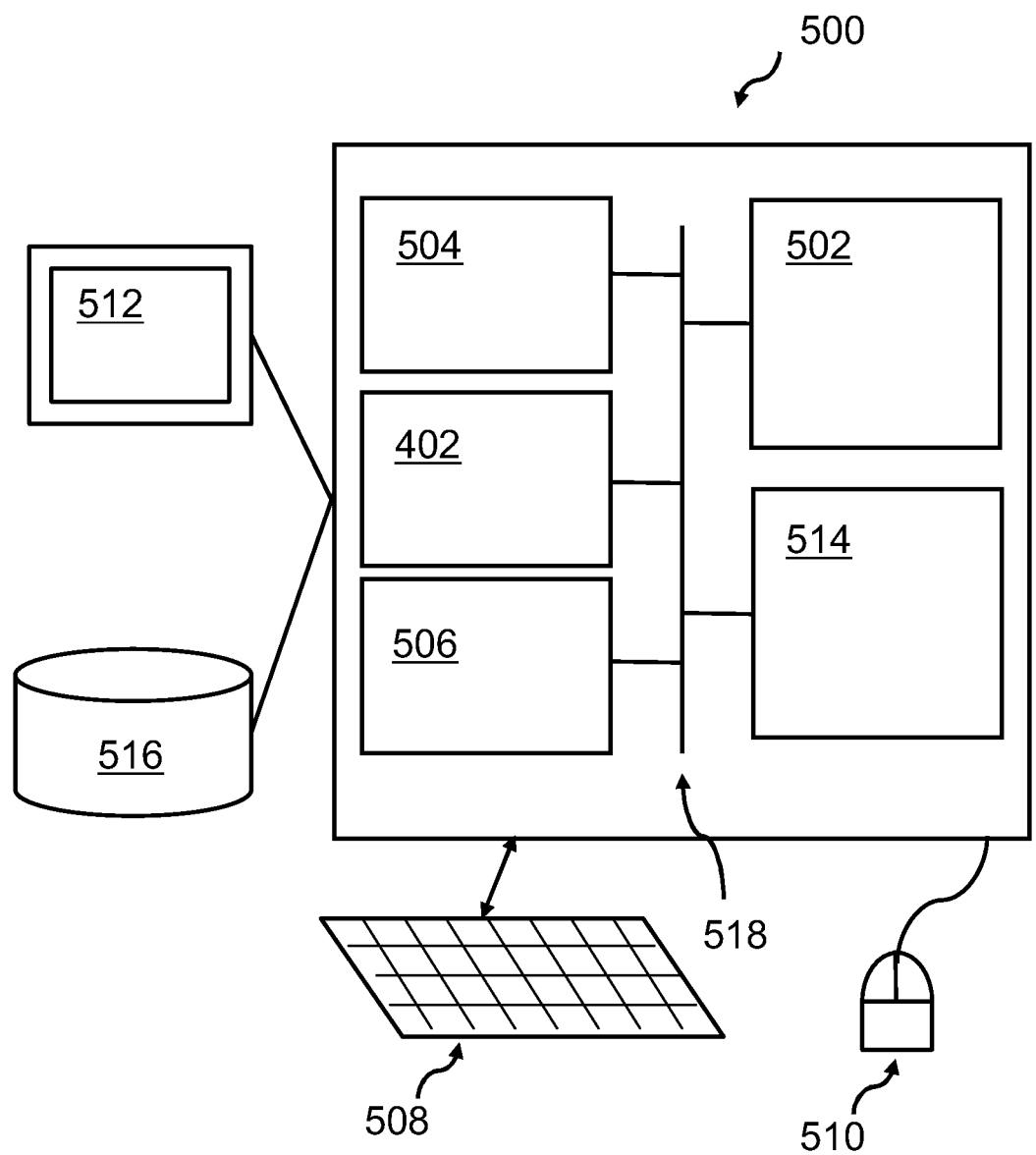
FIG. 5 is a block diagram of an example of an implementation of a computer system for consistent web application presentation.

FIG. 5 is a block diagram of an example of an implementation of a computer system 500 for consistent web application presentation. Embodiments of the present subject matter may be implemented on virtually any type of computer, regardless of the platform being used for storing and/or executing program code. For example, as shown in FIG. 5, the computer system 500 includes one or more processor(s) 502 with one or more cores per processor, associated memory elements 504, an internal storage device 506 (e.g., a hard disk, an optical drive such as a compact disk drive or digital video disk (DVD) drive, a flash memory stick, etc.), and numerous other elements and functionalities typical of today's computers (not shown). The memory elements 504 may include a main memory, employed during actual execution of the program code, and a cache memory that provides temporary storage for at least some program code or data in order to reduce the number of times code must be retrieved from external bulk storage 516 for execution. Elements inside the computer system 500 may be linked together by means of a bus system 518 with corresponding adapters.

Additionally, a style masking engine 402, in particular a web portal server engine comprising the style masking engine 402 may be attached to the bus system 518.

The computer system 500 may also include input means, such as a keyboard 508, a mouse 510, or a microphone (not shown). Furthermore, the computer 500 may include output means, such as a monitor 512 (e.g., a liquid crystal display (LCD), a plasma display, a light emitting diode display (LED), or a cathode ray tube (CRT) monitor). The computer system 500 may be connected to a network (e.g., a local area network (LAN), a wide area network (WAN), such as the Internet, or any other similar type of network, including wireless networks) via a network interface connection 514 (a communication interface). This may allow a coupling to other computer systems. Many different types of computer systems exist, and the aforementioned input and output means may take other forms. As such, the computer system 500 may include at least the minimal processing and input and/or output means to practice embodiments of the present subject matter.

Further, one or more elements of the aforementioned computer system 500 may be located at a remote location and connected to the other elements over a network. Further, embodiments of the technology may be implemented on a distributed system having a plurality of nodes, where each portion of the present subject matter may be located on a different node within the distributed system. In one embodiment of the present subject matter, the node corresponds to a computer system. Alternatively, the node may correspond to a processor with associated physical memory. The node may alternatively correspond to a processor with shared memory and/or resources, or a smartphone.

It should be noted as described above that identification of the source and the target web application may be performed by a web application aggregator. The requesting of output may be performed by a web application renderer, and the combining of the source style with the outputs of the source and the target web application may be performed by a web application style mapper.

A client device may be understood as a client system executing a browser with traditional capabilities. The method as described above may also be performed on the client side rather than on the server side.

In the context of this application, the following principle terms are used:

Masking a style—The phrase "masking a style" may denote replacing an original style of a web application. A style of a web application may be seen as a summary of elements, in particular visual elements that influence the graphical appearance of an output of a web application within a portal. The style of an output of a web application may be defined by the application itself. However, if the style of an application may be removed, covered, over-written or otherwise replaced by another style, it may denote a masking of a style. In this sense, it should be noted that the style of the target web application may also be disguised or that the style of the source web application may be inherited to be used as the style of the target web application. It should also be noted that the styles of the source and the target web application may be synchronized.

Web application—A "web application" may be any application running on computer systems of any kind that produces an output to be displayed. Examples may include calendars, address lists, email programs, transaction programs, banking applications, etc. Different web applications may not be executed on the same physical or virtual server. Actually, in certain computing environments, different applications may be executed on different physical or virtual servers.

Combining styles and outputs of applications into a web page—This expression may denote a process of defining a window to be generated logically within a server (or a client) system before the window may be sent to a client system to be displayed (or displayed by the client).

The above-described methods for controlling a style masking engine and computer system may provide certain advantages. In particular, the method may empower end-users of computer systems. It may allow for a consistent style of web pages that aggregate a multitude of web applications. The method suggests a mechanism that does not demand special web application programming knowledge. Web application developers may not need to take into consideration a style of other web applications that may reside on the same web page. The method of web application masking may support a quick and simple, as well as dynamic creation of consistent web page styles for web pages composed of multiple web applications. This may result in a higher motivation of users to use specific web portal pages providing this technology. The layout of portal pages may no longer be a domain of web administrators, but may become a domain of every user. Every user may design its own style for web portal pages without having any programming skills.

In one implementation, the method of identifying the source web application may involve receiving a request that identifies the source web application with the source style. By this, there may be a defined source web page that may be used as a reference for the source web application style.

In another implementation, the method of receiving the request that identifies the source web application may involve providing a user interface to the client device, in particular to a user, and receiving the request that identifies the source web application with the source style in response to a user selection of the source web application via the user interface of the client device. A user may use a graphical user interface (GUI) that allows the identification of a specific source web application. For example, a right mouse click combined with a pull-down or popup menu within a portal window may be used to identify the source web application. A comparable technique may be used for identifying or defining the target web application(s). The target web application is not limited to just one target application. Several web applications may be defined as target web applications.

In another implementation, the method may involve combining the source style with a second target application on a second requested web page. This may enable a consistent appearance of a series of web pages with different web applications, all having the same style and thus, the same visual experience for a user. This may ease working with a complex application that has different outputs. In this case of "cross page style masking," a single web application on the web portal page containing the source web application may be used.

Such a feature may also be used to redefine a complete skin of a web site including many web pages, or parts of web sites and related pages. A source web application or source portal window may be defined as a reference in the sense of a source web application as described above. The style of this source web application may be inherited to all other windows and artifacts of a skin of a portal relating to a web site or even more web sites. In other words, the styles of all other elements of the portal window may be masked by the style of the reference or source style.

In another implementation, the source style may be a style of an artifact of a portal skin. Portals may have a typical appearance using certain page elements. Using the present subject matter, these page elements may have a common, consistent appearance to a user. Page elements may be, for example, an icon, a frame, a symbol, or any other visual element. All elements or artifacts may have a style. Each of these styles may be defined as the source style to be used for target applications. A skin of a portal page may be a combined appearance of elements of a portal page. One example of how skins may be grouped includes grouping classical skins on one side, representing styles of more traditional versions of a software product, and grouping modern skins on the other side, representing more modern versions of applications or products.

In another implementation, the method may involve storing the source style in a user profile. This may allow appearances of web pages to become user-defined. The same web page may appear completely different to different users because they may have defined different source web applications and profiles as a basis for an appearance of other web applications.

In another implementation of the method may be directed to the feature that the user interface may include a user-defined selection option for at least one source style data element to be combined with the output of the target web application. This feature may be useful in a case where an automatic masking of a style of a target web application may not be possible. In such a situation, the application of the source style to the output of the target web application may lead to an inconsistent appearance. In this case, it may, in particular be useful for a user to individually assign style elements to the output of the target application. It may also allow for a final adjustment of style elements to be used for target web applications. For example, a style of an element, such as a frame for a source web application, may be dark blue, while corresponding frames of target web applications may be redefined to be light blue.

In another implementation, the method of combining the source style with the output of the target web application may involve analyzing a semantic of elements and data of the target web application. In the case of an automatic mapping of style of the source web application and the target web application, a more in-depth analysis, in particular a comparison of the semantics of elements and data of outputs of the source and the target web application, may help the style mapper calculate a style to be used for the target web application that may not be identical to the style of the source web application, but may have slight differences.

In another implementation, the method of combining the source style with the output of the target web application may involve using the source style to replace a web portal skin definition. As described above, a web portal may have a portal skin defined by specific style elements recognized as a special and consistent appearance by a user. With this feature, a user may be allowed to redefine the style of the portal skin using the style of the source web application. As such, the skin style may be masked by the style of the source web application.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been described with respect to a limited number of embodiments, those skilled in the art, benefiting from this disclosure, will appreciate that other embodiments may be devised, which do not depart from the scope of the invention as disclosed herein. Accordingly, the scope of the invention should be limited only by the attached claims.

Elements described in association with different embodiments may be combined. It should also be noted that reference signs in the claims should not be construed as limiting elements.

What is claimed is:

1. A style masking engine for a web server, comprising:
a receiving unit programmed to receive, at the web server from a client device responsive to user selection within a user interface of a source application output window and a target application output window of a web page displayed by the client device, a user request to modify a style of content displayed within the user-selected target application output window of the web page displayed by the client device;
a web application aggregator programmed to identify a source web application and a target web application relating to the user request to modify the style of the content displayed within the user-selected target application output window of the web page;
a web application renderer programmed to request an output from the source web application and an output from the target web application;
a web application style mapper programmed to:
request a source style of the source web application;
format the output of the target web application with the source style of the source web application; and
combine the output of the source web application and the source-style formatted output of the target web application into an updated web page; and
a sending unit programmed to send the updated web page to the client device.

2. A computer system, comprising:
a communication interface; and
one or more processors programmed to:
receive, via the communication interface at a web server from a client device responsive to user selection within a user interface of a source application output window and a target application output window of a web page displayed by the client device, a user request to modify a style of content displayed within the user-selected target application output window of the web page displayed by the client device;
identify a source web application and a target web application relating to the user request to modify the style of the content displayed within the user-selected target application output window of the web page;

request an output from the source web application and an output from the target web application;
request a source style of the source web application;
format the output of the target web application with the source style of the source web application;
combine the output of the source web application and the source-style formatted output of the target web application into an updated web page; and
send the updated web page to the client device via the communication interface.

3. The computer system according to claim 2, where the user request to modify the style of the content displayed within the user-selected target application output window of the web page displayed by the client device further identifies the source web application with the source style and, in being programmed to identify the source web application, the one or more processors are programmed to identify the source web application with the source style in the user request to modify the style of the content displayed within the user-selected target application output window of the web page received from the client device.

4. The computer system according to claim 3, where, in being programmed to identify the source web application with the source style in the user request to modify the style of the content displayed within the user-selected target application output window of the web page received from the client device, the one or more processors are programmed to provide the user interface to the client device.

5. The computer system according to claim 2, where the one or more processors are further programmed to perform cross page style masking by formatting output of a second target application on a second web page with the source style of the source web application.

6. The computer system according to claim 2, where the source style comprises a style of an artifact of a portal skin.

7. The computer system according to claim 2, where, in being programmed to format the output of the target web application with the source style of the source web application, the one or more processors are programmed to analyze a semantic of elements and data of the target web application.

8. The computer system according to claim 2, where, in being programmed to format the output of the target web application with the source style of the source web application, the one or more processors are programmed to use the source style to replace a web portal skin definition.

9. A computer program product comprising a computer readable storage device including computer readable program code, where the computer readable program code when executed on a computer causes the computer to:
receive, at a web server from a client device responsive to user selection within a user interface of a source application output window and a target application output window of a web page displayed by the client device, a user request to modify a style of content displayed within the user-selected target application output window of the web page displayed by the client device;
identify a source web application and a target web application relating to the user request to modify the style of the content displayed within the user-selected target application output window of the web page;
request an output from the source web application and an output from the target web application;
request a source style of the source web application;
format the output of the target web application with the source style of the source web application;
combine the output of the source web application and the source-style formatted output of the target web application into an updated web page; and
send the updated web page to the client device.

10. The computer program product according to claim 9, where the user request to modify the style of the content displayed within the user-selected target application output window of the web page displayed by the client device further identifies the source web application with the source style and, in causing the computer to identify the source web application, the computer readable program code when executed on the computer causes the computer to identify the source web application with the source style in the user request to modify the style of the content displayed within the user-selected target application output window of the web page received from the client device.

11. The computer program product according to claim 10, where, in causing the computer to identify the source web application with the source style in the user request to modify the style of the content displayed within the user-selected target application output window of the web page received from the client device, the computer readable program code when executed on the computer causes the computer to provide the user interface to the client device.

12. The computer program product according to claim 9, where the computer readable program code when executed on the computer further causes the computer to perform cross page style masking by formatting output of a second target application on a second web page with the source style of the source web application.

13. The computer program product according to claim 9, where the source style comprises a style of an artifact of a portal skin.

14. The computer program product according to claim 9, where, in causing the computer to format the output of the target web application with the source style of the source web application, the computer readable program code when executed on the computer causes the computer to analyze a semantic of elements and data of the target web application.

15. The computer program product according to claim 9, where, in causing the computer to format the output of the target web application with the source style of the source web application, the computer readable program code when executed on the computer causes the computer to use the source style to replace a web portal skin definition.

16. The style masking engine for the web server of claim 1, where the web application style mapper is further programmed to:
store the source style of the source web application in a user web-page style profile associated with the user; and
format output of applications associated with additional web pages requested by the user with the source style of the source web application stored in the user web-page style profile, where appearances of web pages become user-defined.

17. The style masking engine for a web server of claim 1, where the web application style mapper is further programmed to perform cross page style masking by formatting output of a second target application on a second web page with the source style of the source web application.

18. The computer system of claim 2, further comprising a memory, and where the one or more processors are further programmed to:
store the source style of the source web application in a user web-page style profile associated with the user in the memory; and format output of applications associated with additional web pages requested by the user with the source style of the source web application stored in the user web-page style profile, where appearances of web pages become user-defined.

19. The computer program product of claim 9, where the computer readable program code when executed on the computer further causes the computer to:

store the source style of the source web application in a user web-page style profile associated with the user; and format output of applications associated with additional web pages requested by the user with the source style of the source web application stored in the user web-page style profile, where appearances of web pages become user-defined.

* * * * *